US012098053B2

(12) United States Patent
Egawa et al.

(10) Patent No.: US 12,098,053 B2
(45) Date of Patent: Sep. 24, 2024

(54) POSTPROCESSING DEVICE THAT CONTROLS ROTATION OF PAIR OF FOLDING ROLLERS ACCORDING TO STATUS OF SHEET

(71) Applicant: KYOCERA Document Solutions Inc., Osaka (JP)

(72) Inventors: Keisuke Egawa, Osaka (JP); Terumitsu Noso, Osaka (JP); Yasunori Ueno, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 6 days.

(21) Appl. No.: 18/111,548

(22) Filed: Feb. 18, 2023

(65) Prior Publication Data

US 2023/0264922 A1 Aug. 24, 2023

(30) Foreign Application Priority Data

Feb. 21, 2022 (JP) ................................ 2022-025001

(51) Int. Cl.
*B65H 45/18* (2006.01)
*B65H 43/00* (2006.01)
*G03G 15/00* (2006.01)

(52) U.S. Cl.
CPC ............ *B65H 45/18* (2013.01); *B65H 43/00* (2013.01); *G03G 15/6582* (2013.01); *B65H 2301/452* (2013.01); *B65H 2511/222* (2013.01); *B65H 2513/512* (2013.01)

(58) Field of Classification Search
CPC ........ B65H 45/18; B65H 43/00; B65H 37/06; B65H 2301/452; B65H 2511/222; B65H 2511/224; B65H 2513/512; G03G 2215/00877
USPC ............. 270/32, 37; 493/434, 435, 437, 444
See application file for complete search history.

(56) References Cited

U.S. PATENT DOCUMENTS

| | | | | |
|---|---|---|---|---|
| 7,673,863 | B2 * | 3/2010 | Iguchi | B65H 45/18 270/32 |
| 8,851,464 | B2 * | 10/2014 | Shimizu | B65H 45/18 270/32 |
| 9,771,236 | B2 * | 9/2017 | Otsu | B42C 19/02 |
| 2013/0087965 | A1 | 4/2013 | Shimizu | |

FOREIGN PATENT DOCUMENTS

| | | | |
|---|---|---|---|
| JP | 2010168175 | A | 8/2010 |
| JP | 2013082512 | A | 5/2013 |

* cited by examiner

*Primary Examiner* — Leslie A Nicholson, III
(74) *Attorney, Agent, or Firm* — IP Business Solutions, LLC

(57) ABSTRACT

A postprocessing device includes a pair of folding rollers, a folding blade, a transport device, a roller driver, a blade driver, and a drive controller. The drive controller selectively performs one of a first rotation control, including controlling the roller driver to keep rotation speed of the pair of folding rollers constant, while the folding blade is moving away from a nip region, and a second rotation control, including controlling the roller driver to stop the rotation or slow down the rotation speed of the pair of folding rollers, while a tip portion of the folding blade is being withdrawn from a folded portion of a sheaf of sheets folded, and to restore the rotation speed of the pair of folding rollers to original rotation speed, after the tip portion of the folding blade has been removed from the folded portion of the sheaf of sheets folded.

5 Claims, 12 Drawing Sheets

Sy

POSTPROCESSING DEVICE THAT CONTROLS ROTATION OF PAIR OF FOLDING ROLLERS ACCORDING TO STATUS OF SHEET

INCORPORATION BY REFERENCE

This application claims priority to Japanese Patent Application No.2022-025001 filed on Feb. 21, 2022, the entire contents of which are incorporated by reference herein.

BACKGROUND

The present disclosure relates to a postprocessing device that performs postprocessing on a sheaf of sheets, formed by stacking a plurality of sheets on each other, and in particular to a technique to fold the sheaf of the sheets.

In an image forming apparatus, an image reading device reads the image of a document, and an image forming device forms the image of the document on a sheet (recording sheet). The postprocessing device receives the sheet having the image of the document formed thereon from the image forming apparatus, and performs postprocessing on the sheet. The postprocessing includes, for example, a folding operation for folding a sheaf of a plurality of sheets stacked on each other.

For example, a folding device is known that includes a pair of folding rollers, and a folding blade movable toward and away from the nip region between the pair of folding rollers. In this folding device, when the sheet is delivered from the image forming apparatus through a delivery roller, and transported to the pair of folding rollers, the folding blade is moved with the sheet to the nip region between the pair of folding rollers, so that the pair of folding rollers catch and fold the sheet. The folding device rotates the pair of folding rollers at the same linear speed as the delivering linear speed of the delivery roller, when folding the sheet. In addition, the folding blade is set to move slower than the linear speed of the pair of folding rollers. With such setting, the folding operation can be executed without the need to slow down or temporarily stop the rotation of the pair of folding rollers, which leads to improved productivity.

In addition, a sheet postprocessing device is known that starts to move a squeezing plate, corresponding to the folding blade, when a predetermined time has elapsed after the leading edge of the sheet, transported by a transport roller pair, was detected by a sheet edge sensor. In this sheet postprocessing device, the squeezing plate is set to move faster than the transport speed of the sheet. Further, the postprocessing device is configured to squeeze the sheet with the squeezing plate, so as to pull back a portion of the sheet downstream of the contact position of the squeezing plate in the sheet transport direction, in the direction opposite to the sheet transport direction. Such an arrangement enables the sheet being transported to be folded at the desired folding position, without the need to provide a stopper for the sheet.

SUMMARY

The disclosure proposes further improvement of the foregoing techniques.

In an aspect, the disclosure provides a postprocessing device that receives a sheet from an image forming apparatus that forms an image of a document on the sheet, and performs postprocessing on the sheet. The postprocessing device includes a pair of folding rollers, a folding blade, a transport device, a roller driver, a blade driver, and a drive controller. The pair of folding rollers define a nip region by being pressed against each other, and rotate in opposite directions to each other. The folding blade is configured to move toward and away from the nip region. The transport device transports the sheet to a position between the nip region and the folding blade. The roller driver causes the pair of folding rollers to rotate. The blade driver moves the folding blade toward and away from the nip region. The drive controller configured to control operation of the roller driver and the blade driver. The drive controller controls the blade driver to cause the folding blade to move toward the nip region, thereby squeezing a sheaf of sheets including a plurality of sheets into the nip region and folding the sheaf of sheets, and then to cause the folding blade to move away from the nip region. The drive controller selectively performs one of a first rotation control, including controlling the roller driver to keep rotation speed of the pair of folding rollers constant, while the folding blade is moving away from the nip region, and a second rotation control, including controlling the roller driver to stop the rotation or slow down the rotation speed of the pair of folding rollers, while a tip portion of the folding blade is being withdrawn from a folded portion of the sheaf of sheets folded, and to restore the rotation speed of the pair of folding rollers to original rotation speed, after the tip portion of the folding blade has been removed from the folded portion of the sheaf of sheets folded.

In another aspect, the disclosure provides a postprocessing device including a pair of folding rollers, a folding blade, a transport device, a roller driver, a blade driver, and a drive controller. The pair of folding rollers define a nip region by being pressed against each other, and rotate in opposite directions to each other. The folding blade is configured to move toward and away from the nip region. The transport device transports the sheets to a position between the nip region and the folding blade. The roller driver causes the pair of folding rollers to rotate. The blade driver moves the folding blade toward and away from the nip region. The drive controller configured to control operation of the roller driver and the blade driver. The drive controller controls the blade driver to cause the folding blade to move toward the nip region, thereby squeezing a sheaf of sheets including a plurality of sheets into the nip region and folding the sheaf of sheets, and then to cause the folding blade to move away from the nip region. The drive controller controls the roller driver, to stop the rotation or slow down the rotation speed of the pair of folding rollers, while a tip portion of the folding blade is being withdrawn from a folded portion of the sheaf of sheets folded, and to restore the rotation speed of the pair of folding rollers to original rotation speed, after the tip portion of the folding blade has been removed from the folded portion of the sheaf of sheets folded.

In still another aspect, the disclosure provides a postprocessing device including a pair of folding rollers, a folding blade, a transport device, a roller driver, a blade driver, and a drive controller. The pair of folding rollers define a nip region by being pressed against each other, and rotate in opposite directions to each other. The folding blade is configured to move toward and away from the nip region. The transport device transports the sheets to a position between the nip region and the folding blade. The roller driver causes the pair of folding rollers to rotate. The blade driver moves the folding blade toward and away from the nip region. The drive controller configured to control operation of the roller driver and the blade driver. The drive controller controls the blade driver to cause the folding blade to move toward the nip region, thereby squeezing a sheaf of sheets including a plurality of sheets into the nip region and folding the sheaf of sheets, and then to cause the folding blade to move away from the nip region. The drive controller keeps rotation speed of the pair of folding rollers constant, while the folding blade is moving away from the nip region.

DETAILED DESCRIPTION

Hereafter, some embodiments of the disclosure will be described, with reference to the drawings.

FIRST EMBODIMENT

Figure 1:
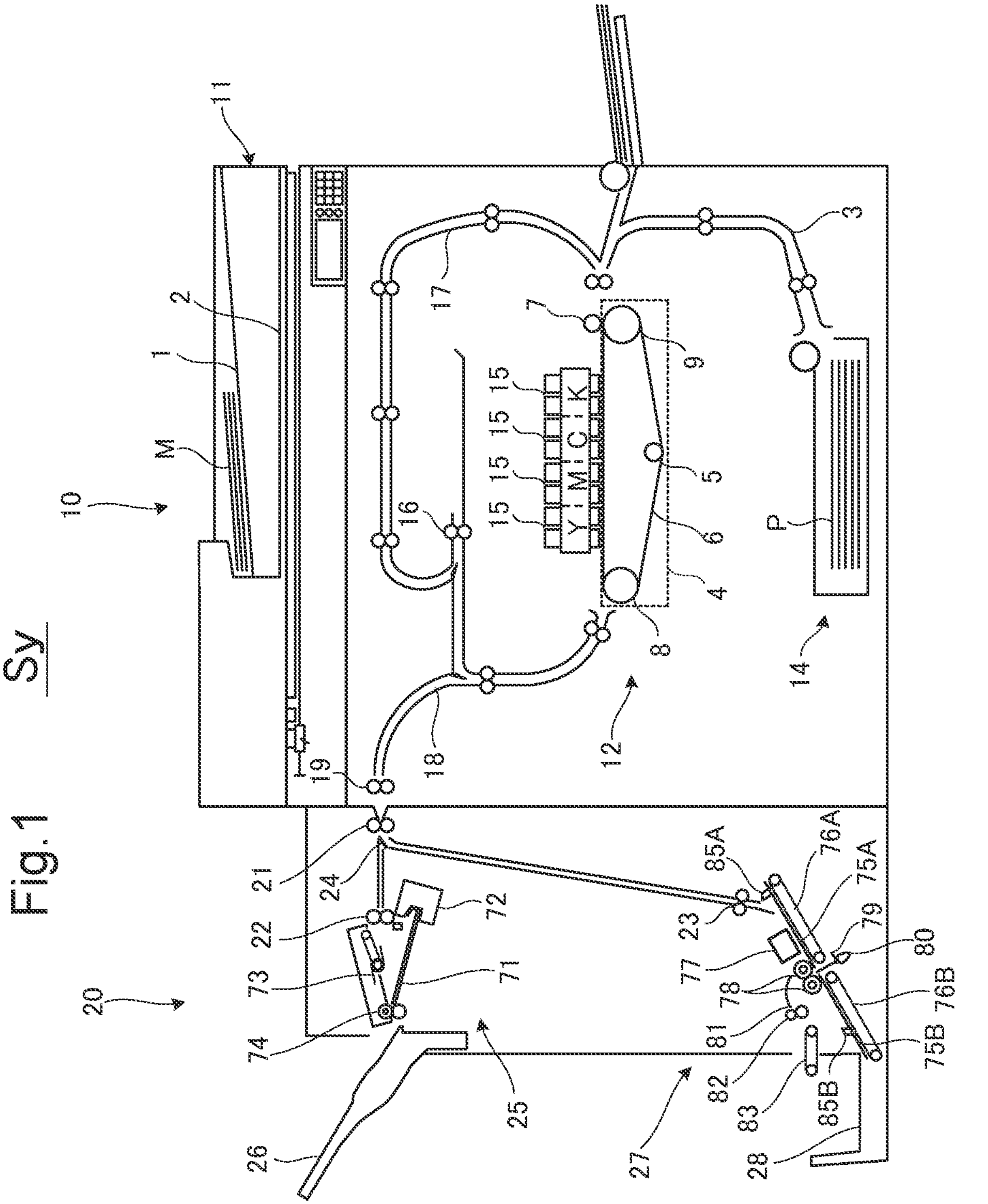
FIG. 1 is a cross-sectional view of an image forming apparatus and a postprocessing device, included in a post-processing system according to a first embodiment.

FIG. 1 is a cross-sectional view of an image forming apparatus 10 and a postprocessing device 20, included in a postprocessing system Sy according to a first embodiment of the disclosure. As shown in FIG. 1, the postprocessing system Sy includes the image forming apparatus 10 that reads an image of a document and forms the image on a recording sheet (exemplifying the sheet in the disclosure), and the postprocessing device 20 that receives the recording sheet from the image forming apparatus 10, and performs postprocessing on the recording sheet.

The image forming apparatus 10 includes an image reading device 11 and an image forming device 12. When a plurality of documents M are placed on a document tray 1, the image reading device 11 sequentially draws out those documents M from the document tray 1 one by one, reads the image of each of the documents M with an image sensor, and sequentially delivers the documents M to the discharge tray 2, so as to stack on each other. The image reading device 11 converts the analog output from the image sensor to a digital signal with respect to the image of each of the documents M, and generates image data representing the image of each of the documents M.

The image forming device 12 forms the image of the document M represented by the image data, on the recording sheet P through an ink jet process, each time each of a plurality of pieces of image data, representing the respective images of a plurality of documents M, is sequentially inputted. The image forming device 12 includes line heads 15 (exemplifying the ink head in the disclosure) that respectively eject ink of four colors, namely black, cyan, magenta, and yellow. The line heads 15 each eject the ink droplets of the corresponding color onto the recording sheet P, delivered to a conveying unit 4 from a paper feeding device 14 through a first transport route 3, thereby forming a color image on the recording sheet P.

The conveying unit 4 includes a drive roller 8, a follower roller 9, tension roller 5, and a transport belt 6. The transport belt 6 is an endless belt stretched around the drive roller 8, the follower roller 9, and the tension roller 5. The drive roller 8 is driven by a motor so as to rotate counterclockwise. When the drive roller 8 is made to rotate, the transport belt 6 revolves counterclockwise, and the follower roller 9 and the tension roller 5 are each passively made to rotate counterclockwise.

The tension roller 5 serves to maintain the tension of the transport belt 6 at an appropriate level. An adsorption roller 7, located in contact with the transport belt 6, electrically charges the transport belt 6, to thereby electrostatically adsorb the recording sheet P delivered from the paper feeding device 14, to the transport belt 6.

After causing the image forming device 12 to form the image of the document M on the recording sheets P, a controller 46 of the image forming apparatus 10 (see FIG. 2), to be subsequently described, transports the recording sheet P to the postprocessing device 20, through a relay transport route 18 and a delivery roller 19.

When the image of the document M is also to be formed on the back face of the recording sheet P, the controller 46 performs switchback transport, including transporting the recording sheet P from the relay transport route 18 to the transport roller 16, once stopping the transport roller 16 and then reversely rotating the same, to return the recording sheet P to the conveying unit 4 through the second transport route 17, in the inverted orientation. Then the controller 46 causes the image forming device 12 to form the image of the document M on the back face of the recording sheet P, and transports the recording sheet P to the postprocessing device 20, through the relay transport route 18 and the delivery roller 19.

The postprocessing device 20 includes a plurality of transport roller pairs 21, 22, and 23, a branching nail 24, a one-side binder 25, an output tray 26, a saddle-stitch binder 27, and an output tray 28. The transport roller pairs 21, 22, and 23 each serve to transport the recording sheet P delivered from the image forming apparatus 10. The branching nail 24 guides the recording sheet P that has passed through the transport roller pair 21 in the horizontal direction toward the transport roller pair 22, or to the lower side toward the transport roller pair 23.

The one-side binder 25 performs stapling operation on one end portion of a sheaf of the recording sheets, composed of a plurality of recording sheets P stacked on each other. To the output tray 26, the sheaf of the recording sheets stapled by the one-side binder 25 is delivered. The saddle-stitch binder 27 performs the stapling operation on the central position of the sheaf of the recording sheets, composed of a plurality of recording sheets P stacked on each other, and folds the sheaf of the recording sheets at the center. To the output tray 28, the sheaf of the recording sheets stapled and folded by the saddle-stitch binder 27 is delivered.

The one-side binder 25 includes a processing tray 71, a stapling device 72, a paddle 73, and a delivery roller 74. To the processing tray 71, a plurality of recording sheets P, transported by the transport roller pairs 21 and 22, are each sequentially delivered. The stapling device 72 performs the stapling operation, on one end portion of the sheaf of the recording sheets, composed of a plurality of recording sheets P stacked on each other, on the processing tray 71. The paddle 73 urges the recording sheet P to move to the stapling device 72, each time the recording sheet P is delivered to the processing tray 71. The delivery roller 74 delivers the sheaf of the recording sheets stapled by the stapling device 72, to the output tray 26.

The saddle-stitch binder 27 includes a pair of divided trays 75A and 75B, a pair of stoppers 85A and 85B, revolving belts 76A and 76B, a stapling device 77, a pair of folding rollers 78, a folding blade 79, a rotary cam 80, a guide 81, a transport roller pair 82, and a delivery conveyor 83. To the divided trays 75A and 75B, a plurality of recording sheets P, transported by the transport roller pairs 21 and 23, are each sequentially delivered. The pair of stoppers 85A and 85B each serve to move the recording sheet P or the sheaf of the recording sheets composed of a plurality of recording sheets P on the divided trays 75A and 75B, to adjust the position of the recording sheet P or the sheaf of the recording sheets. The revolving belts 76A and 76B respectively support the stoppers 85A and 85B, and move the stoppers 85A and 85B in the transport direction of the recording sheet P.

The stapling device 77 performs the stapling operation on the central portion of the sheaf of the recording sheets on the divided trays 75A and 75B. The pair of folding rollers 78 are located on the upper side of the space between the divided trays 75A and 75B, and pressed against each other. The folding blade 79 is opposed to the nip region between the pair of folding rollers 78, across the space between the divided trays 75A and 75B. The rotary cam 80 serves to move the folding blade 79 toward and away from the nip region between the pair of folding rollers 78. The guide 81 is located on the downstream side in the transport direction of the sheaf of the recording sheets transported by the pair of folding rollers 78, to guide the sheaf of the recording sheets. The transport roller pair 82 transports the sheaf of the recording sheets. The delivery conveyor 83 delivers the sheaf of the recording sheets to the output tray 28.

Figure 2:
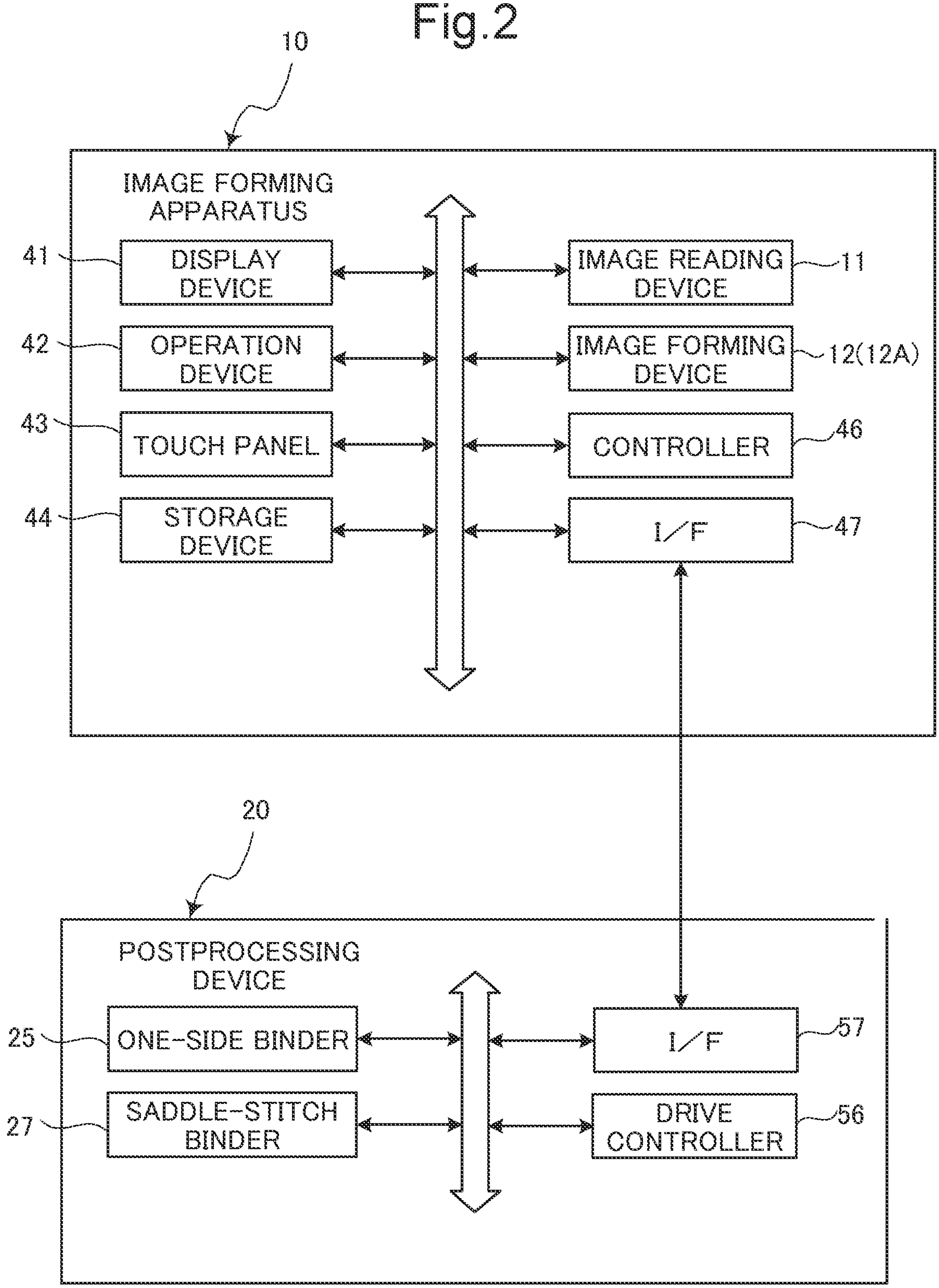
FIG. 2 is a functional block diagram schematically showing an essential internal configuration of the image forming apparatus and the postprocessing device image.

Hereunder, a configuration related to the control operation of the image forming apparatus 10 and the postprocessing device 20 will be described. FIG. 2 is a functional block diagram showing an essential internal configuration of the image forming apparatus 10 and the postprocessing device 20. As shown in FIG. 2, the image forming apparatus 10 includes the image reading device 11, the image forming device 12, a display device 41, an operation device 42, a touch panel 43, a storage device 44, the controller 46, and an interface (I/F) 47. The mentioned components are configured to transmit and receive data and signals to and from each other, via a bus.

The display device 41 is, for example, constituted of a liquid crystal display (LCD) or an organic light-emitting diode (OLED) display. The operation device 42 includes physical keys such as a tenkey, an enter key, and a start key.

A touch panel 43 is overlaid on the screen of the display device 41. The touch panel 43 is, for example, based on a resistive film or electrostatic capacitance. The touch panel 43 detects a contact (touch) of the user's finger, along with the touched position, and outputs a detection signal indicating the coordinate of the touched position, to the control device 46.

The storage device 44 is a large-capacity storage device such as a solid-state drive (SSD) or a hard disk drive (HDD). The storage device 44 contains various application programs and various types of data.

The controller 46 is connected to the image reading device 11, the image forming device 12, the display device 41, the operation device 42, the touch panel 43, the storage device 44, and the I/F 47. The controller 46 controls the operation of the components cited above, and transmits and receives signals and data to and from those components. In other words, the controller 46 executes the controls and processings necessary for the operation of the image forming apparatus 10.

The controller 46 includes a processor, a random-access memory (RAM), a read-only memory (ROM), and so forth. The processor is, for example, a central processing unit (CPU), an application specific integrated circuit (ASIC), or a micro processing unit (MPU). The controller 46 executes various controls and processings necessary for the operation by the image forming apparatus 10, according to the control program stored in the ROM or the storage device 44.

The controller 46 controls the displaying operation of the display device 41. The controller 46 receives the instruction inputted by the user, on the basis of the detection signal outputted from the touch panel 63 or a press of the physical key on the operation device 62. For example, the controller 66 receives the instruction according to a touch operation, performed through the touch panel 63 on the graphical user interface (GUI) displayed on the screen of the display device 61.

The postprocessing device 20 includes the one-side binder 25, the saddle-stitch binder 27, a drive controller 56, and an I/F 57. These components are configured to transmit and receive data and signals to and from each other, via a bus. The drive controller 56 includes a processor, a RAM, a ROM, and so forth. The drive controller 56 controls the operation of the one-side binder 25 and the saddle-stitch binder 27.

The controller 46 of the image forming apparatus 10 and the drive controller 56 of the postprocessing device 20 are configured to input and output data and signals between each other, via the respective I/Fs 47 and 57. For example, the controller 46 of the image forming apparatus 10 outputs a control signal for instructing the postprocessing device 20 to perform the postprocessing, to the drive controller 56 of the postprocessing device 20. The drive controller 56 of the postprocessing device 20 controls the operation of the one-side binder 25 or the saddle-stitch binder 27, according to the control signal received.

When the saddle-stitch binding operation is to be executed in the postprocessing system Sy, the user inputs the instruction to execute the saddle-stitch binding operation, by operating, through the touch panel 43, the GUI displayed on the screen of the display device 41. Then the user sets a plurality of documents M on the image reading device 11, and presses the start key of the operation device 42, thus inputting a copying instruction.

Upon receipt of the instruction to execute the saddle-stitch binding operation and the copying instruction, the controller 46 of the image forming apparatus 10 outputs a control signal indicating the instruction to execute the saddle-stitch binding operation to the postprocessing device 20 through the I/F 47 and, at the same time, causes the image reading device 11 to sequentially read the image of each of the documents M. Then the controller 46 causes the image forming device 12 to form the image of each of the documents M on one recording sheet P, and sequentially transport the recording sheets P to the postprocessing device 20.

When the recording sheets P delivered from the image forming apparatus 10 are sequentially received, the drive controller 56 of the postprocessing device 20 controls the operation of the motors that respectively serve as the drive source for the revolving belts 76A and 76B of the saddle-stitch binder 27, the pair of folding rollers 78, the rotary cam 80, the transport roller pair 82, and the delivery conveyor 83, thereby causing the mentioned components to operate, on the basis of the control signal indicating the instruction to execute the saddle-stitch binding operation, inputted through the I/F 57. As result, the stapling operation is performed on the central portion of the sheaf of the recording sheets composed of a plurality of recording sheets P, and the sheaf of the recording sheets is folded at the center and delivered to the output tray 28.

Figure 3:
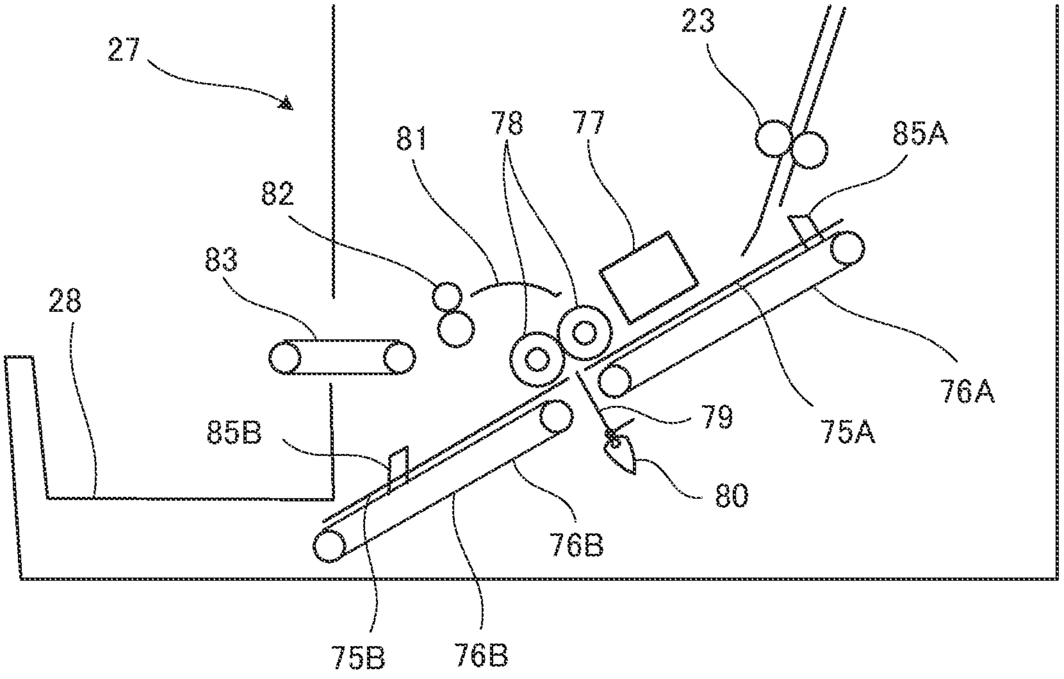
FIG. 3 is an enlarged cross-sectional view of a saddle-stitch binder in the postprocessing device.

FIG. 3 is an enlarged cross-sectional view of the saddle-stitch binder 27. In the saddle-stitch binder 2, as shown in FIG. 3, the two divided trays 75A and 75B are aligned along the transport direction of the recording sheet P delivered through the transport roller pair 23, with a clearance between each other. A plurality of recording sheets P are sequentially delivered through the transport roller pair 23, and stacked on the divided trays 75A and 75B.

Each time the recording sheet P is placed on the divided trays 75A and 75B, the drive controller 56 drives the revolving belts 76A and 76B according to the size of the recording sheet P in the transport direction, so as to abut the respective edges of the recording sheet P against the stoppers 85A and 85B, thus aligning the edges of the recording sheets P. As result, the recording sheets P stacked on the divided trays 75A and 75B constitute the sheaf of the recording sheets. The drive controller 56 moves the sheaf of the recording sheets on the divided trays 75A and 75B using the stoppers 85A and 85B, by driving the revolving belts 76A and 76B, thereby locating the center of the sheaf of the recording sheets at the stapling position of the stapling device 77.

The drive controller 56 causes the stapling device 77 to perform the stapling operation on the center of the sheaf of the recording sheets. The drive controller 56 then moves the sheaf of the recording sheets on the divided trays 75A and 75B using the stoppers 85A and 85B, by driving the revolving belts 76A and 76B, thereby locating the center of the sheaf of the recording sheets at the position corresponding to the space between the divided trays 75A and 75B. The drive controller 56 causes the pair of folding rollers 78 to rotate in opposite directions to each other, as indicated by arrows in FIG. 4, and causes the rotary cam 80 to rotate so as to move the folding blade 79 toward and away from the nip region between the pair of folding rollers 78, as indicated by an arrow D in FIG. 4.

When the folding blade 79 is moved toward the nip region between the pair of folding rollers 78, with the sheaf of the recording sheets interposed therebetween, the central portion of the sheaf of the recording sheets is lifted up by the tip portion of the folding blade 79, and then squeezed into the nip region between the pair of folding rollers 78. As result, the sheaf of the recording sheets is folded along the center, and assumes a double-folded shape. The sheaf of the recording sheets thus folded passes through the pair of folding rollers 78, and guided by the guide 81 to the transport roller pair 82. Then the sheaf of the recording sheets is transported by the transport roller pair 82 to the delivery conveyor 83, and delivered to the output tray 28 through the delivery conveyor 83.

Figure 4:
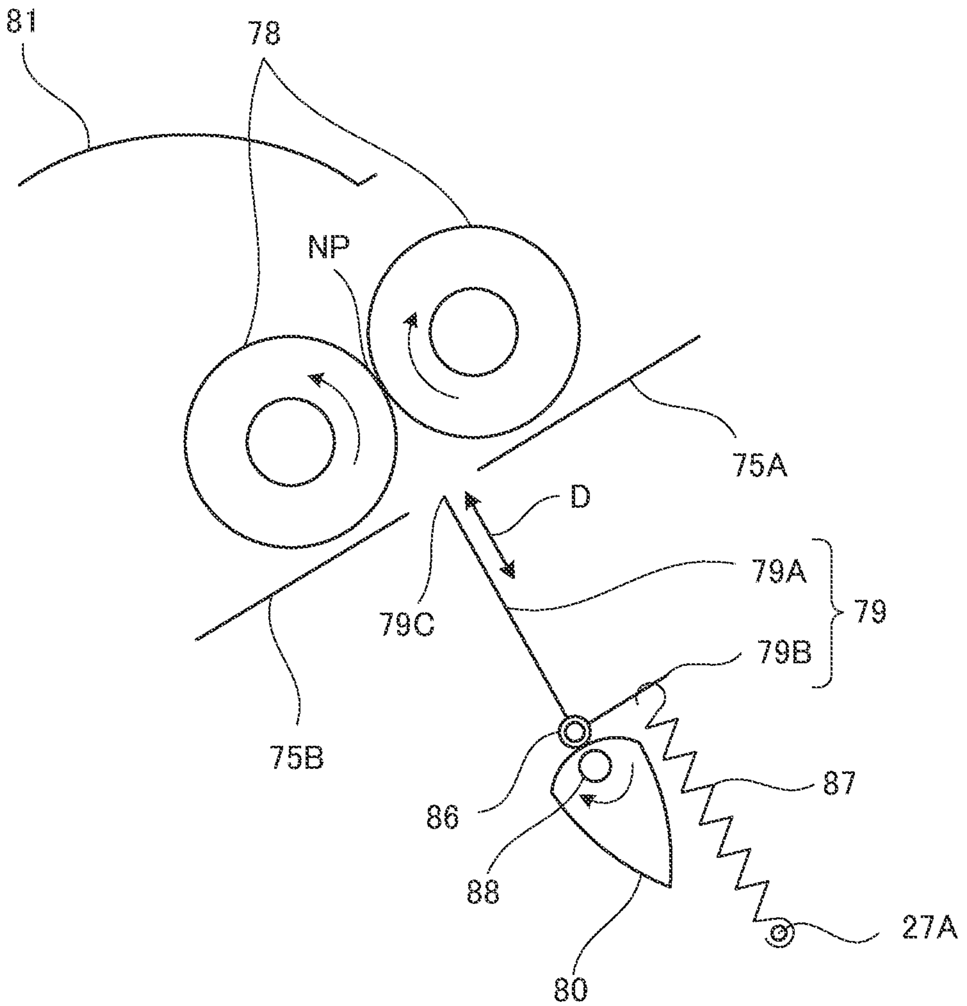
FIG. 4 is an enlarged cross-sectional view of a part of the saddle-stitch binder.

FIG. 4 is an enlarged cross-sectional view of the divided trays 75A and 75B, the pair of folding rollers 78, the folding blade 79, and the rotary cam 80, of the saddle-stitch binder 27. As shown in FIG. 4, the folding blade 79 has an L-shaped cross-section, including a vertical plate 79A and a bottom plate 79B. The folding blade 79 is supported so as to move toward and away from the nip region NP between the pair of folding rollers 78, as indicated by the arrow D. At the lower end portion of the vertical plate 79A of the folding blade 79, a contact roller 86 is rotatably supported.

The rotary cam 80 is supported by a rotary shaft 88. The rotary cam 80 rotates interlocked with the rotary shaft 88. A coil spring 87 is provided, in a stretched state, between the bottom plate 79B of the folding blade 79 and a fixed position 27A in the saddle-stitch binder 27 (e.g., frame of the saddle-stitch binder 27). The coil spring 87 biases the folding blade 79 in the direction away from the nip region NP between the pair of folding rollers 78.

The contact roller 86 of the folding blade 79 moves along the direction of the arrow D, together with the folding blade 79. The rotation center of the rotary shaft 88 and the rotary cam 80 is located on the extension line of the moving track of the contact roller 86 along the direction of the arrow D. Since the folding blade 79 is biased by the coil spring 87 in the direction away from the nip region NP between the pair of folding rollers 78, the contact roller 86 of the folding blade 79 is constantly pressed against the circumferential surface of the rotary cam 80. Accordingly, when the rotary cam 80 (i.e., rotary shaft 88) rotates, the contact roller 86 of the folding blade 79 follows up movement of the circumferential surface of the rotary cam 80, so as to move in the direction of the arrow D, and therefore the tip portion 79C of the folding blade 79 also moves in the direction of the arrow D.

The rotary cam 80 and the rotary shaft 88 are made to rotate, for example, by a stepping motor serving as the drive source, and a gear unit that transmits the rotation of the output shaft of the stepping motor to the rotary shaft 88. The rotary cam 80, the contact roller 86, the coil spring 87, the rotary shaft 88, and the stepping motor and the gear unit that cause the rotary shaft 88 and the rotary cam 80 to rotate, exemplify the blade driver for moving the folding blade 79 in the direction of the arrow D, in the disclosure.

Likewise, the pair of folding rollers 78 are made to rotate, for example, by a motor serving as the drive source, and a gear unit that transmits the rotation of the output shaft of the stepping motor to the pair of folding rollers 78. The motor and the gear unit that serve as the drive source of the pair of folding rollers 78 exemplify the roller driver for causing the pair of folding rollers 78, in the disclosure.

Figure 5A:
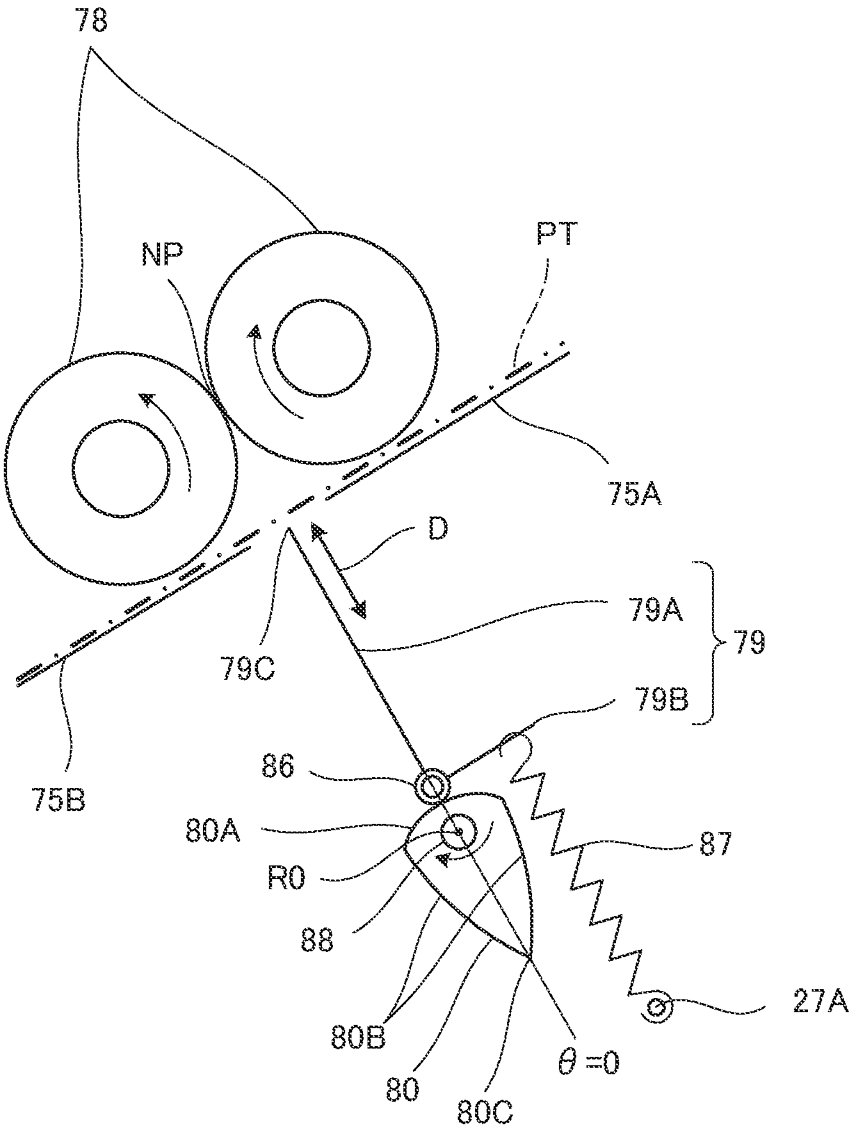
FIG. 5A and FIG. 5B are cross-sectional views each showing how a folding blade moves.

Referring to FIG. 5A, the rotary cam 80 includes a circumferential section 80A closest to the rotation center RO of the rotary cam 80 (rotary shaft 88), a circumferential section 80C farthest from the rotation center RO, and two circumferential sections 80B located between the circumferential section 80A and the circumferential section 80C. When the contact roller 86 of the folding blade 79 is in contact with the circumferential section 80A of the rotary cam 80, the contact roller 86 is farthest from the nip region NP between the pair of folding rollers 78. In other words, the tip portion 79C of the folding blade 79 is also at the farthest position from the nip region NP, and retracted from the space between the divided trays 75A and 75B. It is in such a state, that the sheaf of the recording sheets PT is moved on the divided trays 75A and 75B, so that the central portion of the sheaf of the recording sheets PT is located at the position corresponding to the space between the divided trays 75A and 75B.

Figure 5B:
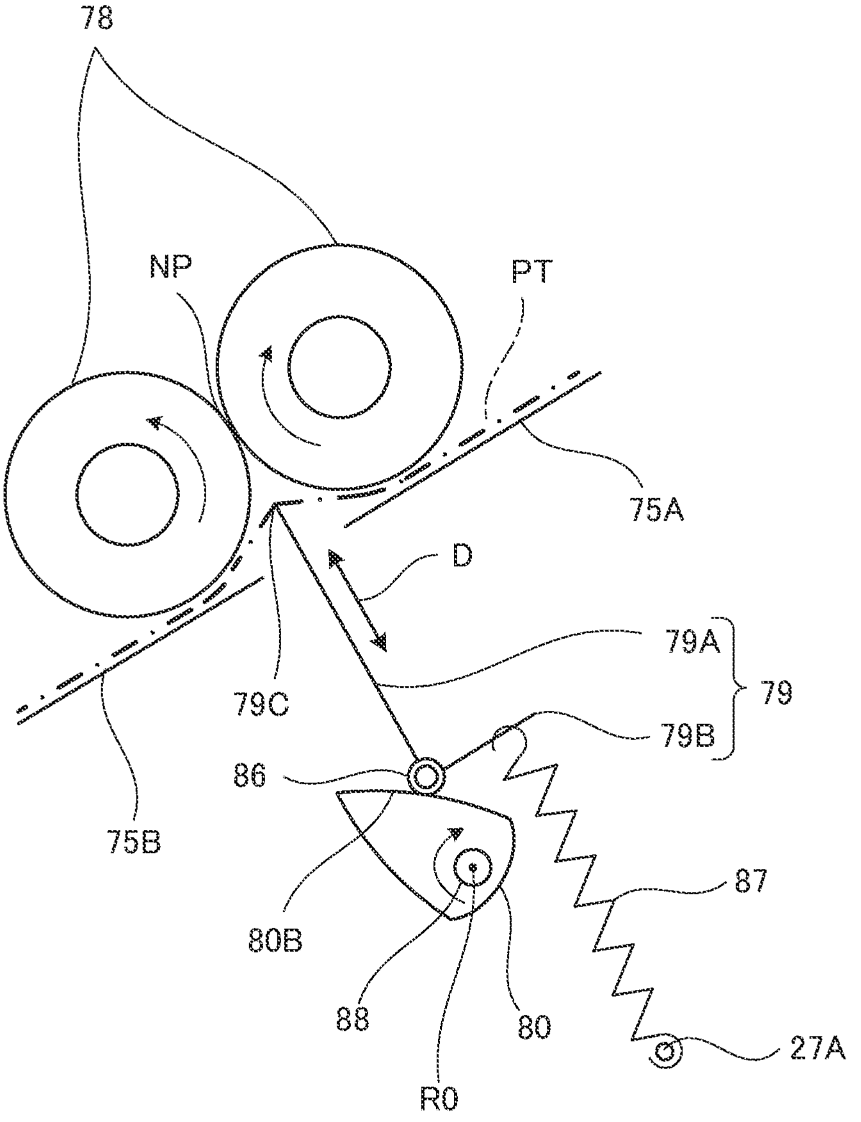

Proceeding to FIG. 5B, when the rotary cam 80 (rotary shaft 88) rotates in the direction indicated by an arrow, the contact roller 86 of the folding blade 79 is lifted up by one of the circumferential sections 80B of the rotary cam 80, so as to move toward the nip region NP, and the tip portion 79C of the folding blade 79 also moves toward the nip region NP, and lifts up the central portion of the sheaf of the recording sheets PT. Thus, the folding operation of the central portion of the sheaf of the recording sheets PT is started.

Figure 6A:
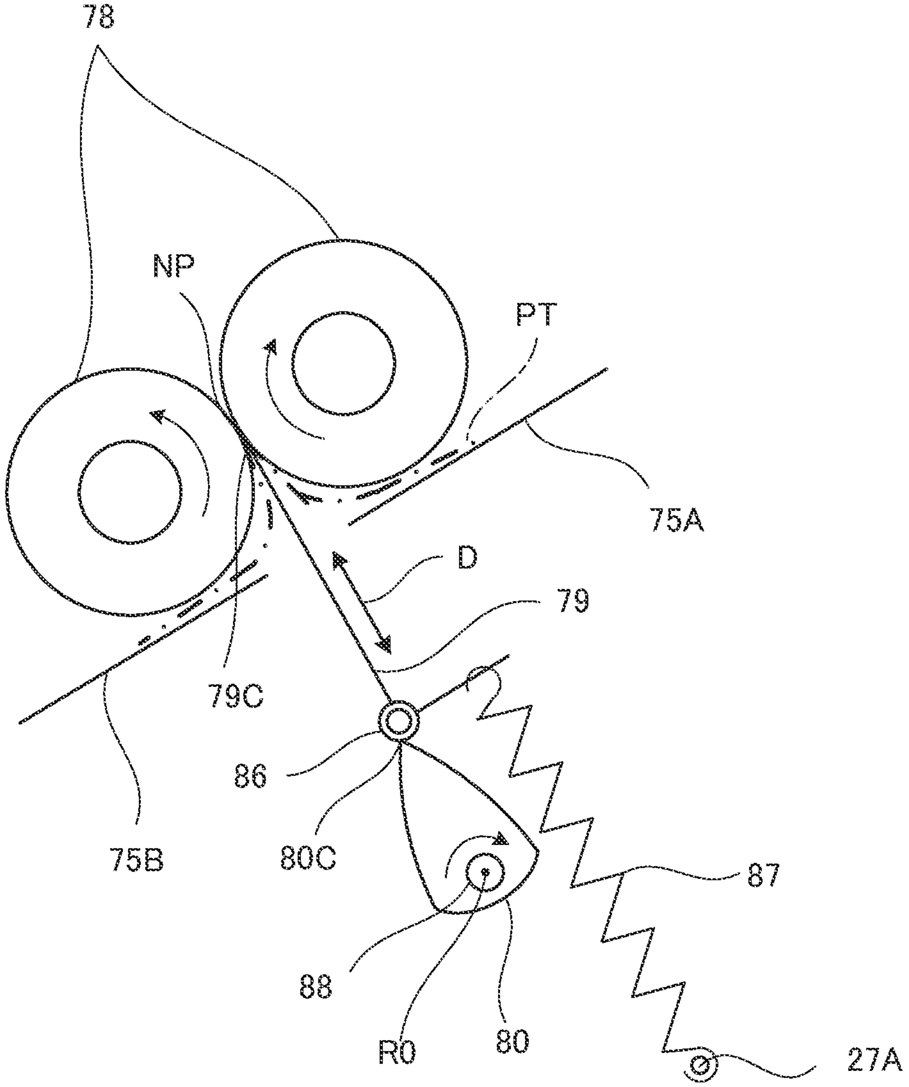
FIG. 6A and FIG. 6B are cross-sectional views each showing how the folding blade moves, after FIG. 5A and FIG. 5B.

Proceeding to FIG. 6A, when the rotary cam 80 (rotary shaft 88) rotates by 180 degrees, and the contact roller 86 of the folding blade 79 enters into contact with the circumferential section 80C, the contact roller 86 of the folding blade 79 reaches the position closest to the nip region NP between the pair of folding rollers 78, and the tip portion 79C of the folding blade 79 also reaches the position closest to the nip region NP. As result, the central portion of the sheaf of the recording sheets PT is squeezed into the nip region NP between the pair of folding rollers 78, thus to be folded.

Figure 6B:
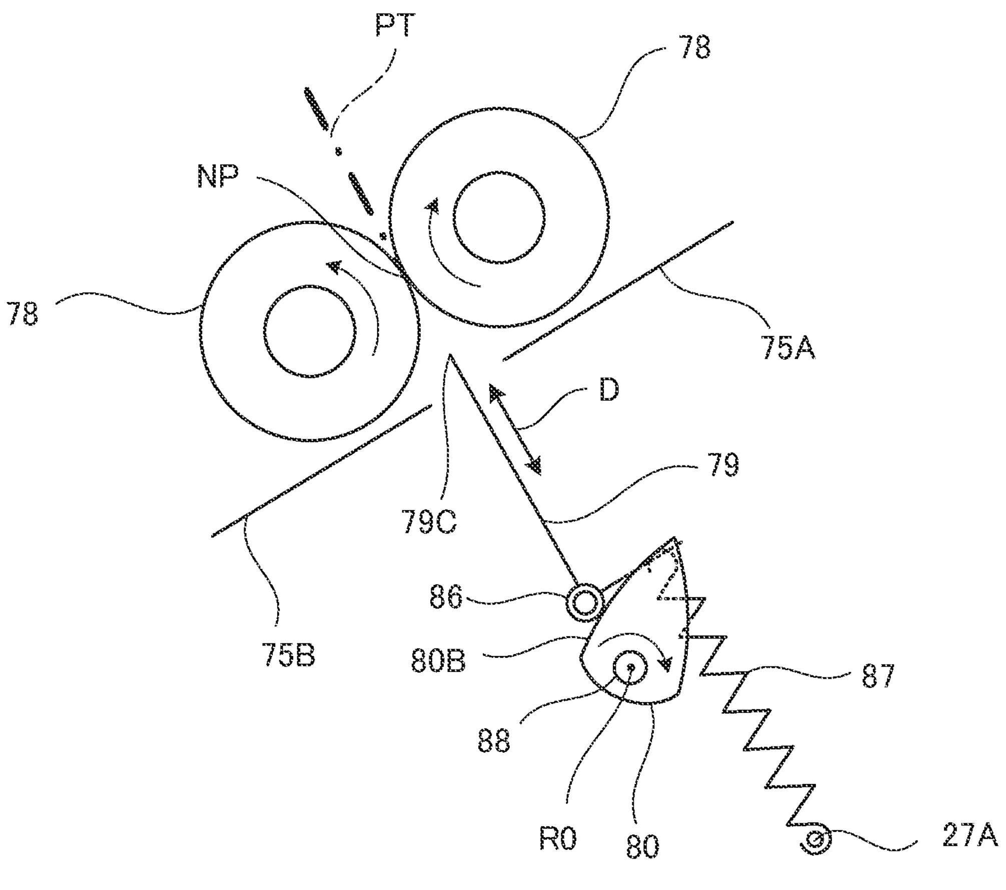

Proceeding to FIG. 6B, when the rotary cam 80 (rotary shaft 88) rotates further, the contact roller 86 of the folding blade 79 moves away from the nip region NP between the pair of folding rollers 78, by keeping contact with the other circumferential section 80B of the rotary cam 80, and the tip portion 79C of the folding blade 79 also moves away from the nip region NP and withdraws from the space between the divided trays 75A and 75B. The sheaf of the recording sheets PT which has been folded passes through the nip region NP between the pair of folding rollers 78, and is transported along the guide 81.

As described above, when the tip portion 79C of the folding blade 79 is made to move toward the nip region NP between the pair of folding rollers 78, by the rotational movement of the rotary cam 80, the central portion of the sheaf of the recording sheets PT is squeezed into the nip region NP by the tip portion 79C, so that the sheaf of the recording sheets PT is folded by the pair of folding rollers 78.

Now, the image forming device 12 forms the image of the document on the recording sheet P, by the ink jet printing method using the ink. Accordingly, when the sheaf of the recording sheets PT is folded by the saddle-stitch binder 27 of the postprocessing device 20, before the ink applied to the recording sheet P dries out, the surface of the recording sheet P of the sheaf of the recording sheets PT still remains wet. Therefore, there is high friction between the sheaf of the recording sheets PT folded in the nip region NP and the pair of folding rollers 78, which impede slippage therebetween. In addition, the friction between the sheaf of the recording sheets PT and the tip portion 79C of the folding blade 79 caught in the folded portion of the folded sheaf of the recording sheets PT is also high, which impede slippage therebetween. Therefore, a large force is required to withdraw and remove the tip portion 79C of the folding blade 79, from the folded portion of the folded sheaf of the recording sheets PT. Further, as is apparent from FIG. 6A and FIG. 6B, the rotation direction of the circumferential surface of the pair of folding rollers 78 in contact with the sheaf of the recording sheets PT, and the moving direction of the tip portion 79C of the folding blade 79 become opposite to each other, when the tip portion 79C of the folding blade 79 is withdrawn, and therefore the force for withdrawing the tip portion 79C of the folding blade 79 is exerted in the direction to impede the rotation of the pair of folding rollers 78. As result, for example, the pair of folding rollers 78 may be locked, and an excessive current may be supplied to the motor driving the pair of folding rollers 78. In such a case, a protection circuit of the motor may be activated, so that the motor is stopped.

In the first embodiment, therefore, drive controller 56 either stops the rotation of the pair of folding rollers 78, while the tip portion 79C of the folding blade 79 is being withdrawn from the folded portion of the sheaf of the recording sheets PT folded in the nip region NP, and resumes the rotation of the pair of folding rollers 78 at the original speed, after the tip portion 79C of the folding blade 79 has been removed from the folded portion of the folded sheaf of the recording sheets PT, or reduces the rotation speed of the pair of folding rollers 78, while the tip portion 79C of the folding blade 79 is being withdrawn from the folded portion of the folded sheaf of the recording sheets PT, and restores the rotation speed of the pair of folding rollers 78 to the original speed, after the tip portion 79C of the folding blade 79 has been removed from the folded portion of the folded sheaf of the recording sheets PT. In this case, even when the pair of folding rollers 78 are locked, because of the force for withdrawing the tip portion 79C of the folding blade 79 being exerted in the direction to impede the rotation of the pair of folding rollers 78, the rotation of the motor serving as the drive source of the pair of folding rollers 78 is either stopped or slowed down. Therefore, the motor is exempted from being subjected to an excessive current, or only receives an excessive current of a low level, which prevents the trouble that the motor is stopped.

Referring now to a flowchart shown in FIG. 7, a control process for stopping the rotation of the pair of folding rollers 78 and resuming the rotation at the original rotation speed, or reducing the rotation speed of the pair of folding rollers 78 and restoring the rotation speed to the original speed, will be described hereunder.

The drive controller 56 causes the folding blade 79 to move toward the nip region NP of the pair of folding rollers 78, while causing the pair of folding rollers 78 to rotate, as shown in FIG. 5A and FIG. 5B, for example by causing the motor serving as the drive source of the pair of folding rollers 78, and the motor serving as the drive source of the rotary cam 80, to rotate. When the tip portion 79C of the folding blade 79 comes closest to the nip region NP as shown in FIG. 6A, as result of the mentioned operation of the drive controller 56, the central portion of the sheaf of the recording sheets PT is squeezed into the nip region NP between the pair of folding rollers 78, thus to be folded (step S101).

Here, the rotational position of the rotary cam 80, assumed when the tip portion 79C of the folding blade 79 is located farthest from the nip region NP as shown in FIG. 5A, will be defined as an initial position. The drive controller 56 determines in advance the rotation angle θ of the rotary cam 80, corresponding to the initial position, as "0" (θ=0). The drive controller 56 controls the number of pulse signals applied to the stepping motor serving as the drive source of the rotary cam 80, to thereby cause the rotary cam 80 to rotate, and calculates the rotation angle θ of the rotary cam 80 from the initial position, on the basis of the number of pulse signals (step S102).

The drive controller 56 decides whether the rotation angle θ calculated as above has reached a first threshold θ1 (step S103). In the case where the calculated rotation angle θ has not yet reached the first threshold θ1 (No at step S103), the drive controller 56 repeats the operation of step S102 and step S103.

Figure 8A:
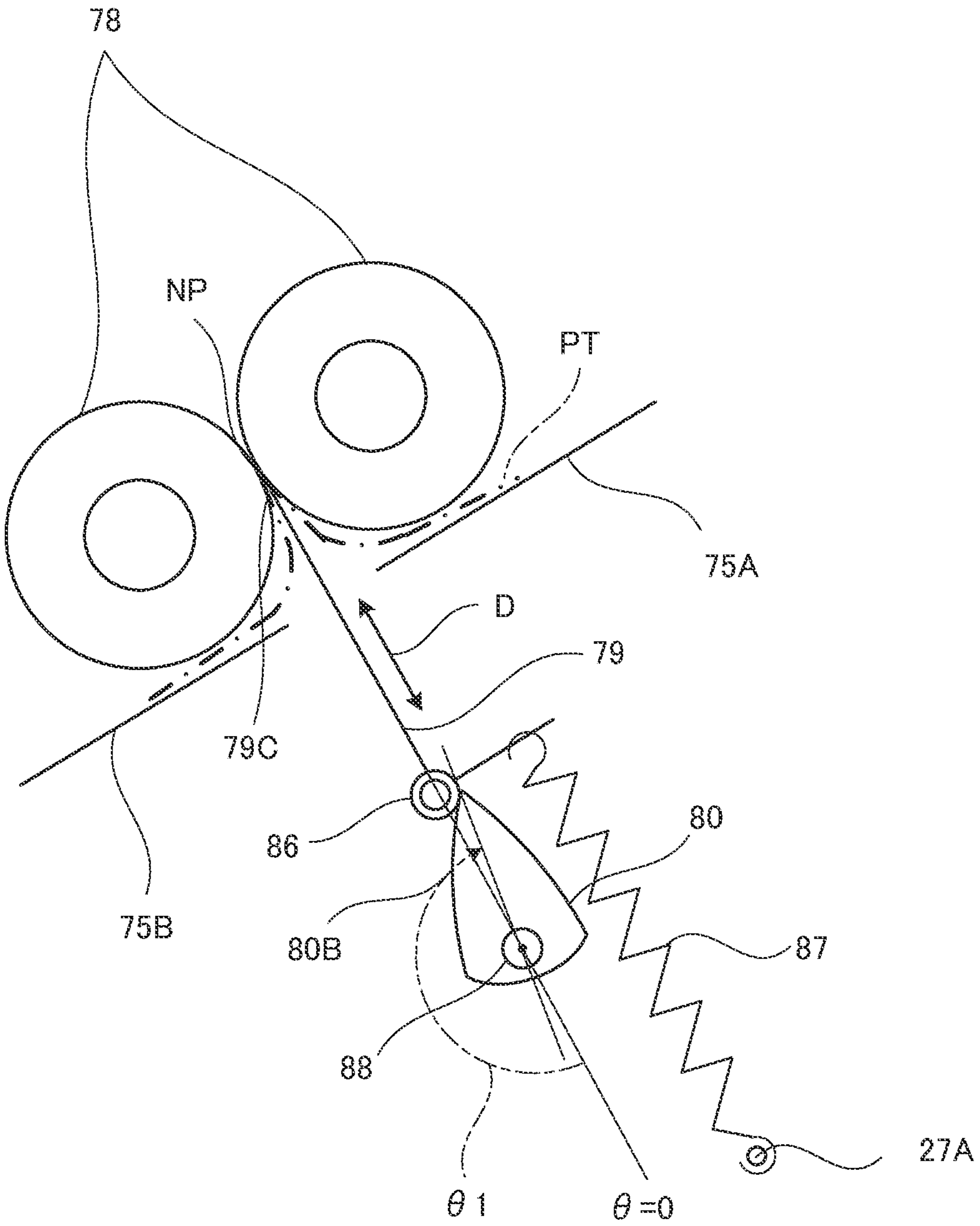
FIG. 8A is a schematic drawing showing a rotation angle of a rotary cam, assumed when the rotation of the pair of folding rollers is stopped or slowed down.

The first threshold θ1 represents the rotation angle θ of the rotary cam 80, assumed immediately after the tip portion 79C of the folding blade 79 was located closest to the nip region NP between the pair of folding rollers 78, as shown in FIG. 8A. Accordingly, the rotation angle θ of the rotary cam 80 reaches the first threshold θ1, at the time point that the drive controller 56 starts to move the tip portion 79C of the folding blade 79 in the direction to be withdrawn from the folded portion of the folded sheaf of the recording sheets PT (i.e., direction away from the nip region NP).

When the rotation angle θ calculated at step S102 reaches the first threshold θ1 (Yes at step S103), the drive controller 56 either stops the moto serving as the drive source of the pair of folding rollers 78, thereby stopping the rotation of the pair of folding rollers 78, or reduces the rotation speed of the motor, thereby reducing the rotation speed of the pair of folding rollers 78 (step S104). The drive controller 56 also causes the stepping motor serving as the drive source of the rotary cam 80 to continuously rotate, thus causing the rotary cam 80 to rotate, so that the tip portion 79C of the folding blade 79 moves further away from the nip region NP between the pair of folding rollers 78.

While the tip portion 79C of the folding blade 79 is moving further away from the nip region NP, the drive controller 56 calculates the rotation angle θ of the rotary cam 80, on the basis of the number of pulse signals applied to the stepping motor serving as the drive source of the rotary cam 80 (step S105). The drive controller 56 then decides whether the rotation angle θ thus calculated has reached a second threshold θ2 (step S106). In the case where the calculated rotation angle θ has not yet reached the second threshold θ2 (No at step S106), the drive controller 56 repeats the operation of step S105 and step S106.

Figure 8B:
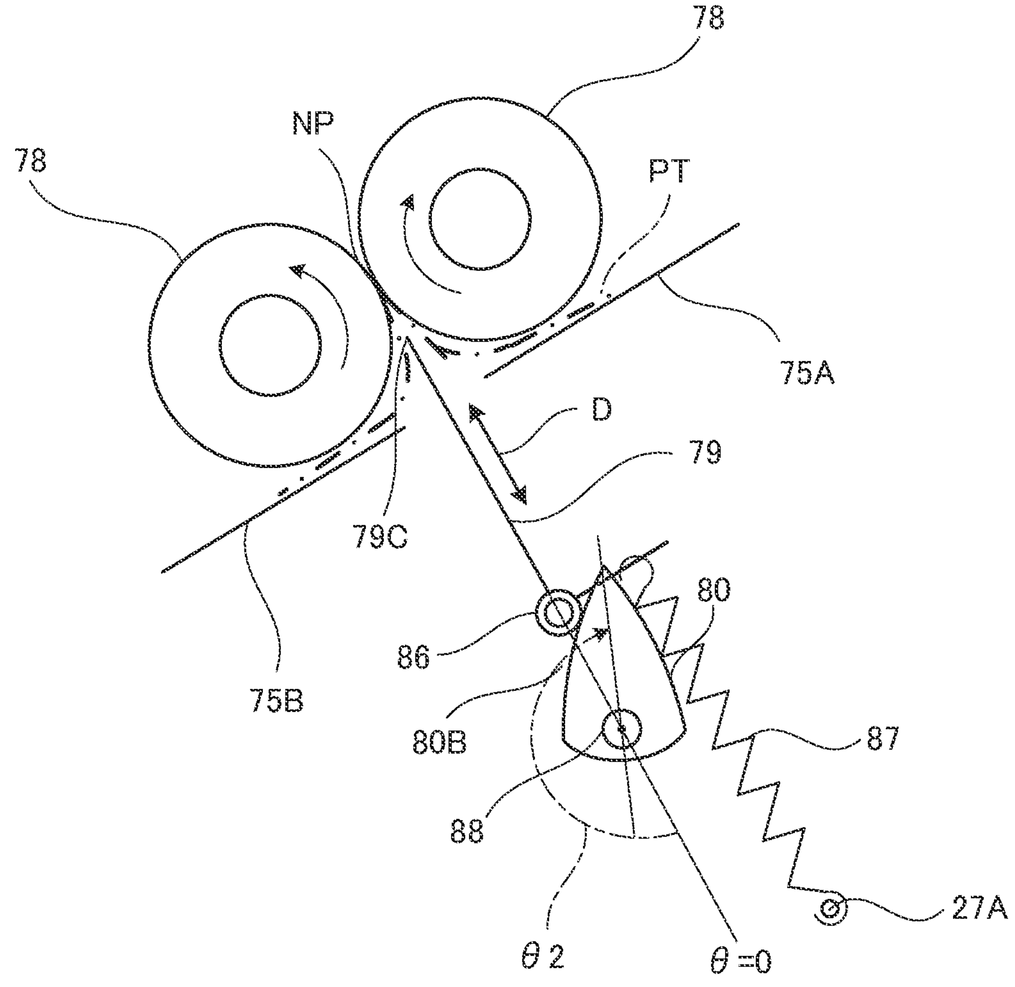
FIG. 8B is a schematic drawing showing the rotation angle of the rotary cam, assumed when the rotation of the pair of folding rollers is resumed, or rotation speed of the pair of folding rollers is restored.

The second threshold θ2 represents the rotation angle θ of the rotary cam 80, assumed when the tip portion 79C of the folding blade 79 has reached a predetermined position sufficiently distant from the nip region NP between the pair of folding rollers 78, as shown in FIG. 8B, and is larger than the first threshold θ1. In other words, the rotation angle θ of the rotary cam 80 reaches the second threshold θ2, when the tip portion 79C of the folding blade 79 has been completely removed from the folded portion of the folded sheaf of the recording sheets PT.

When the rotation angle θ calculated at step S105 reaches the second threshold θ2 (Yes at step S106), the drive controller 56 either resumes the rotation of the motor serving as the drive source of pair of folding rollers 78 at the original rotation speed, from the stopped state, thus resuming the rotation of the pair of folding rollers 78 at the original rotation speed, or restores the rotation of the motor to the original speed from the reduced state, thus resuming the rotation of the pair of folding rollers 78 at the original rotation speed (step S107).

As result, the folded sheaf of the recording sheets PT passes through the nip region NP between the pair of folding rollers 78, and is transported along the guide 81. The drive controller 56 also causes the stepping motor serving as the drive source of the rotary cam 80 to continuously rotate, thus causing the rotary cam 80 to rotate, so that the tip portion 79C of the folding blade 79 moves further away from the nip region NP.

According to the first embodiment, as described above, the drive controller 56 brings the tip portion 79C of the folding blade 79 closest to the nip region NP, thereby squeezing the central portion of the sheaf of the recording sheets PT into the nip region NP between the pair of folding rollers 78, as shown in FIG. 6A. When the rotation angle θ of the rotary cam 80 reaches the first threshold θ1, so that the tip portion 79C of the folding blade 79 starts to be withdrawn from the folded portion of the sheaf of the recording sheets PT, as shown in FIG. 8A, the drive controller 56 wither stops the rotation of the pair of folding rollers 78, or reduces the rotation speed of the pair of folding rollers 78. When the rotation angle θ of the rotary cam 80 reaches the second threshold θ2, so that the tip portion 79C of the folding blade 79 has been completely removed from the folded portion of the folded sheaf of the recording sheets PT as shown in FIG. 8, the drive controller 56 either resumes the rotation of the pair of folding rollers 78, or restores the rotation speed thereof.

In other words, the drive controller 56 either temporarily stops the rotation of the pair of folding rollers 78, or temporarily reduces the rotation speed thereof, while the tip portion 79C of the folding blade 79 is being withdrawn from the folded portion of the sheaf of the recording sheets PT folded in the nip region NP. Therefore, even when the pair of folding rollers 78 are locked, because of the force for withdrawing the tip portion 79C of the folding blade 79 being exerted in the direction to impede the rotation of the pair of folding rollers 78, the motor is exempted from being subjected to an excessive current, or only receives an excessive current of a low level, which prevents the trouble that the motor is stopped.

Regarding the first threshold θ1 and the second threshold θ2, it is preferable to experimentally identify an angle range where the force for withdrawing the tip portion 79C of the folding blade 79 is exert in the direction to impede the rotation of the pair of folding rollers 78, thereby locking the same, and set these thresholds to the angle range thus identified.

SECOND EMBODIMENT

Figure 9:
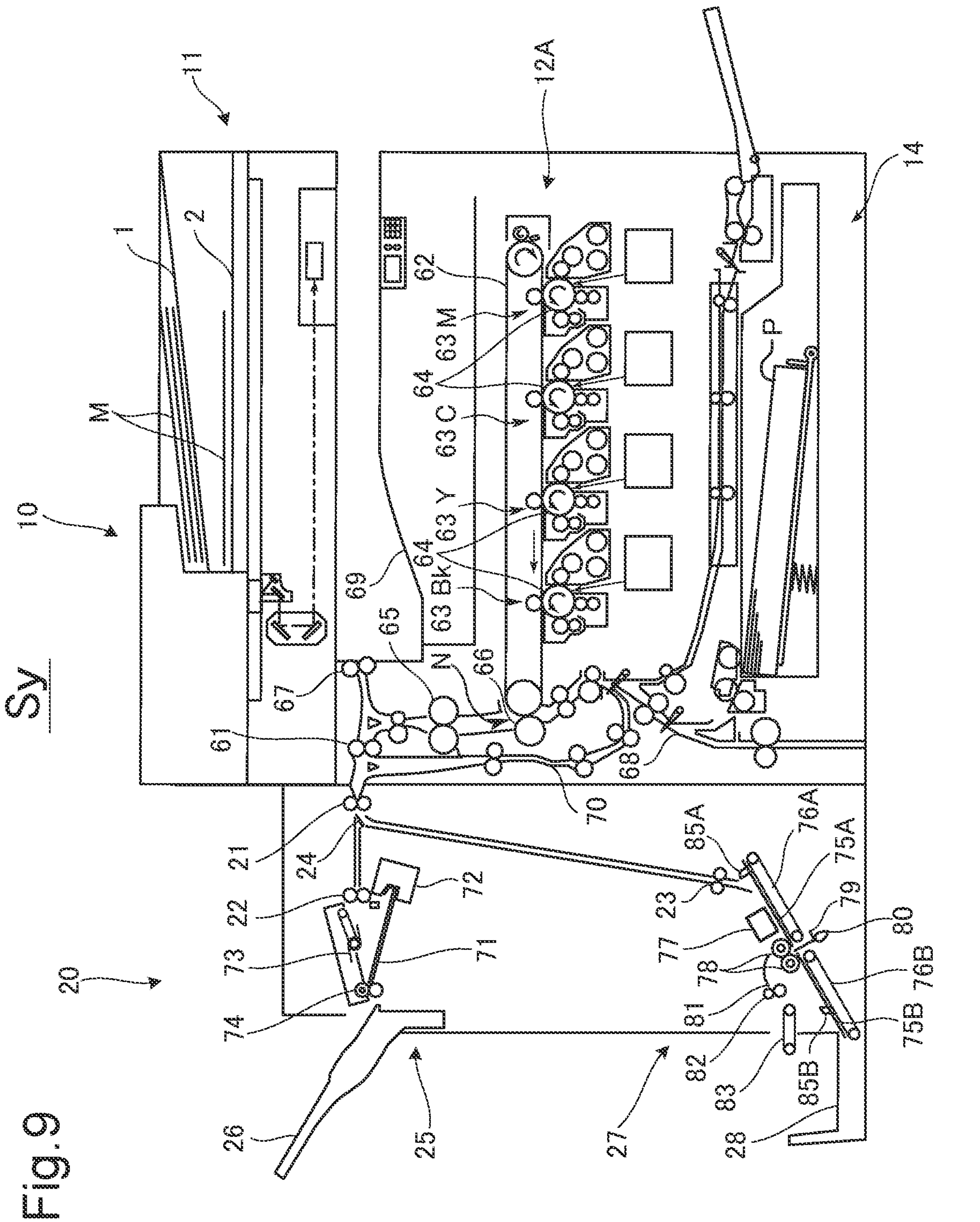
FIG. 9 is a cross-sectional view of an image forming apparatus and a postprocessing device, included in a post-processing system according to a second embodiment.

FIG. 9 is a cross-sectional view of the image forming apparatus 10 and the postprocessing device 20, included in the postprocessing system Sy according to a second embodiment. In FIG. 8, the elements having the similar function as those shown in FIG. 1 are given the same numeral. In the following passage, the description of the same elements as those of the postprocessing system Sy according to the first embodiment will not be repeated.

As shown in FIG. 9, the postprocessing system Sy according to the second embodiment includes the image forming apparatus 10 that reads the image of a document and forms the image on the recording sheet, and the postprocessing device 20 that receives the recording sheet from the image forming apparatus 10, and performs postprocessing on the recording sheet.

The image forming apparatus 10 includes the image reading device 11, and an image forming device 12A. image forming device 12A forms the image of the document M represented by the image data, on the recording sheet P by electrophotography, using a developing agent containing toner, each time each of a plurality of pieces of image data, representing the respective images of a plurality of documents M, is sequentially inputted. The image forming device 12A includes an image forming unit 63M for magenta, an image forming unit 63C for cyan, an image forming unit 63Y for yellow, and an image forming unit 63Bk for black.

The image forming units 63M, 63C, 63Y, and 63Bk each electrically charges the surface of a photoconductor drum 64 uniformly, expose the surface of the photoconductor drum 64 thereby forming an electrostatic latent image, develop the electrostatic latent image on the surface of the photoconductor drum 64 into a toner image, and transfer the toner image from the surface of the photoconductor drum 64 to an intermediate transfer belt 62. Through such process, a colored toner image is formed on the intermediate transfer belt 62. The colored toner image is secondarily transferred to the recording sheet P transported from the paper feeding device 14 along a first transport route 68, in a nip region N between the intermediate transfer belt 62 and a secondary transfer roller 66.

After causing the image forming device 12A to form the image of the document M on the recording sheets P, the controller 46 of the image forming apparatus 10 causes a fixing device 65 to heat-press each recording sheet P to thereby fix the toner image on the recording sheet P by thermal compression. The controller 46 then transports the recording sheet P to the postprocessing device 20, through a transport roller 61.

When the image of the document M is also to be formed on the back face of the recording sheet P, the controller 46 performs switchback transport, including transporting the recording sheet P to the delivery roller 67 on the near side of an output tray 69, and once stopping and then reversely rotating the delivery roller 67, to return the recording sheet P from the transport roller 61 to the nip region N of the first transport route 68 through a second transport route 70, in the inverted orientation. Then the controller 46 causes the image forming device 12A to form the image of the document M on the back face of the recording sheet P, and transports the recording sheet P to the postprocessing device 20, through the transport roller 61.

The configuration of the mechanism of the postprocessing device 20 is the same as that of the first embodiment, described with reference to FIG. 1. The postprocessing device 20 sequentially receives the recording sheets P delivered from the image forming apparatus 10. For example, the saddle-stitch binder 27 performs the stapling operation on the central portion of the sheaf of the recording sheets, composed of a plurality of recording sheets P, folds the sheaf of the recording sheets at the center, and delivers the sheaf of the recording sheets to the output tray 28.

The configuration related to the control operation of the image forming apparatus 10 and the postprocessing device 20 according to the second embodiment is generally similar to that of the first embodiment shown in FIG. 2. However, the image forming apparatus 10 according to the second embodiment is different from that of the first embodiment, in including the image forming device 12A that performs the electrophotography, instead of the image forming device 12 that performs the ink jet printing. The controller 46 of the image forming apparatus 10 according to the second embodiment controls the image forming device 12A that performs the electrophotography, so as to cause the image forming device 12A to form the image of the document M on the recording sheet P, through the process described above.

In the second embodiment, the controller 46 of the image forming apparatus 10 is connected to the image reading device 11, the image forming device 12A, the display device 41, the operation device 42, the touch panel 43, the storage device 44, and the I/F 47. The controller 46 controls the operation of the mentioned components, and transmits and receives signals and data, to and from these components.

In the second embodiment, the controller 46 of the image forming apparatus 10 and the drive controller 56 of the postprocessing device 20 are configured to transmit and receive data and signals between each other, via the respective I/Fs 47 and 57. For example, the controller 46 of the image forming apparatus 10 outputs a control signal for instructing the postprocessing device 20 to perform the postprocessing, to the drive controller 56 of the postprocessing device 20. The drive controller 56 of the postprocessing device 20 controls the operation of the one-side binder 25 or the saddle-stitch binder 27, according to the control signal received.

As mentioned above, the image forming device 12A forms the image on the recording sheet P by electrophotography, using a developing agent containing toner. Accordingly, the surface of the recording sheets P constituting the sheaf is dry. In addition, the toner and wax are mixed in the developing agent, the surface of the recording sheet P is smoothened by the wax. Therefore, the friction between the sheaf of the recording sheets folded in the nip region NP and the pair of folding rollers 78 is low, and slippage is prone to take place therebetween. In addition, the friction between the sheaf of the recording sheets and the tip portion 79C of the folding blade 79 in the folded portion of the folded sheaf of the recording sheets is also low, and slippage is also prone to take place therebetween. Therefore, a large force is not required to withdraw and remove the tip portion 79C of the folding blade 79 from the folded sheaf of the recording sheets, and such force does not impede the rotation of the pair of folding rollers 78.

On the other hand, the recording sheets in the sheaf are prone to be deviated from each other. Accordingly, in the case where, as in the first embodiment, the rotation of the pair of folding rollers 78 is stopped or slowed down, while the tip portion 79C of the folding blade 79 is being withdrawn from the folded portion of the sheaf of the recording sheets folded in the nip region NP, the sheaf of the recording sheets is dragged in the direction in which the tip portion 79C of the folding blade 79 is withdrawn. Therefore, the recording sheets P in the sheaf are deviated in the direction in which the tip portion 79C is withdrawn, except for the outermost one of the sheaf in direct contact with the pair of folding rollers 78. Besides, the pair of folding rollers 78 reversely rotate by an amount corresponding to backlash of the gear unit transmitting the driving force of the motor, and the recording sheets P in the sheaf are further deviated from the outermost one.

In the second embodiment, therefore, the drive controller 56 keeps the rotation speed of the pair of folding rollers 78 constant, while the folding blade 79 is moving toward or away from the nip region NP between the pair of folding rollers 78.

To be more specific, the drive controller 56 causes the motor serving as the drive source of the pair of folding rollers 78, and the stepping motor serving as the drive source of the rotary cam 80 to rotate, thereby causing the folding blade 79 to move toward the nip region NP between the pair of folding rollers 78, while causing the pair of folding rollers 78 to rotate to rotate, as shown in FIG. 5A and FIG. 5B. Upon bringing the tip portion 79A of the folding blade 79 closest to the nip region NP between the pair of folding rollers 78 as shown in FIG. 6A, while causing the pair of folding rollers 78 to keep rotating, the drive controller 56 causes the tip portion 79A of the folding blade 79 to move away from the nip region NP between the pair of folding rollers 78 as shown in FIG. 6B, while causing the pair of folding rollers 78 to keep rotating.

In the second embodiment, in other words, the drive controller 56 causes the pair of folding rollers 78 to keep rotating at a constant rotation speed, without stopping, while the tip portion 79C of the folding blade 79 is moving toward and away from the nip region NP between the pair of folding rollers 78. Therefore, the sheaf of the recording sheets can be quickly folded and transported by the pair of folding rollers 78, without a chance that the recording sheets P become deviated from each other, despite being dragged in the direction in which the tip portion 79C of the folding blade 79 is withdrawn.

THIRD EMBODIMENT

The third embodiment is based on the assumption that the postprocessing device 20 is compatible with both of the image forming apparatus 10 that performs the ink jet printing, and the image forming apparatus 10 that performs the electrophotography. The drive controller 56 of the postprocessing device 20 controls the rotation and stopping of the pair of folding rollers 78 in the saddle-stitch binder 27 of the postprocessing device, in a similar manner to the first and second embodiments, depending on whether the image forming apparatus 10 is configured to perform the ink jet printing or electrophotography.

According to the first embodiment, when the rotation angle θ of the rotary cam 80 reaches the first threshold θ1, and the tip portion 79C of the folding blade 79 starts to move in the direction to be withdrawn from the folded portion of the sheaf of the recording sheets, the drive controller 56 either stops or slows down the rotation of the pair of folding rollers 78. In addition, when the rotation angle θ reaches the second threshold θ2, and the tip portion 79C of the folding blade 79 is completely removed from the folded portion of the folded sheaf of the recording sheets, the drive controller 56 resumes the rotation of the pair of folding rollers 78 at the original rotation speed, from the stopped state, or from the slow-down state. Hereinafter, such rotation control of the pair of folding rollers 78 will be referred to as second rotation control.

According to the second embodiment, the drive controller 56 causes the pair of folding rollers 78 to keep rotating at a constant rotation speed, without stopping, while the tip portion 79C of the folding blade 79 is moving toward and away from the nip region NP between the pair of folding rollers 78. Hereinafter, such rotation control of the pair of folding rollers 78 will be referred to as first rotation control.

The user instructs the execution of the saddle-stitch binding operation, by operating the GUI displayed on the screen of the display device 41, through the touch panel 43, sets a plurality of documents M on the image reading device 11, and presses the start key on the operation device 42.

The controller 46 of the image forming apparatus 10 outputs the instruction to execute the saddle-stitch binding operation, and a control signal indicating whether the image forming apparatus 10 is configured to perform the ink jet printing or the electrophotography, to the postprocessing device 20 via the I/F 47. At the same time, the controller 46 causes the image reading device 11 to sequentially read the images of the documents M, causes the image forming device 12 to form the images of the documents M on the respective recording sheets P, and sequentially transports the recording sheets P to the postprocessing device 20.

The drive controller 56 of the postprocessing device 20 receives the control signal via the I/F 57, and sequentially receives the recording sheets P delivered from the image forming apparatus 10. The drive controller 56 decides whether the image forming apparatus 10 is configured to perform the ink jet printing or the electrophotography, according to the control signal, controls the operation of the saddle-stitch binder 27 so as to perform the stapling operation on the central portion of the sheaf of the recording sheets composed of a plurality of recording sheets P, folds the sheaf of the recording sheets at the center, and delivers the sheaf of the recording sheets to the output tray 28.

Figure 7:
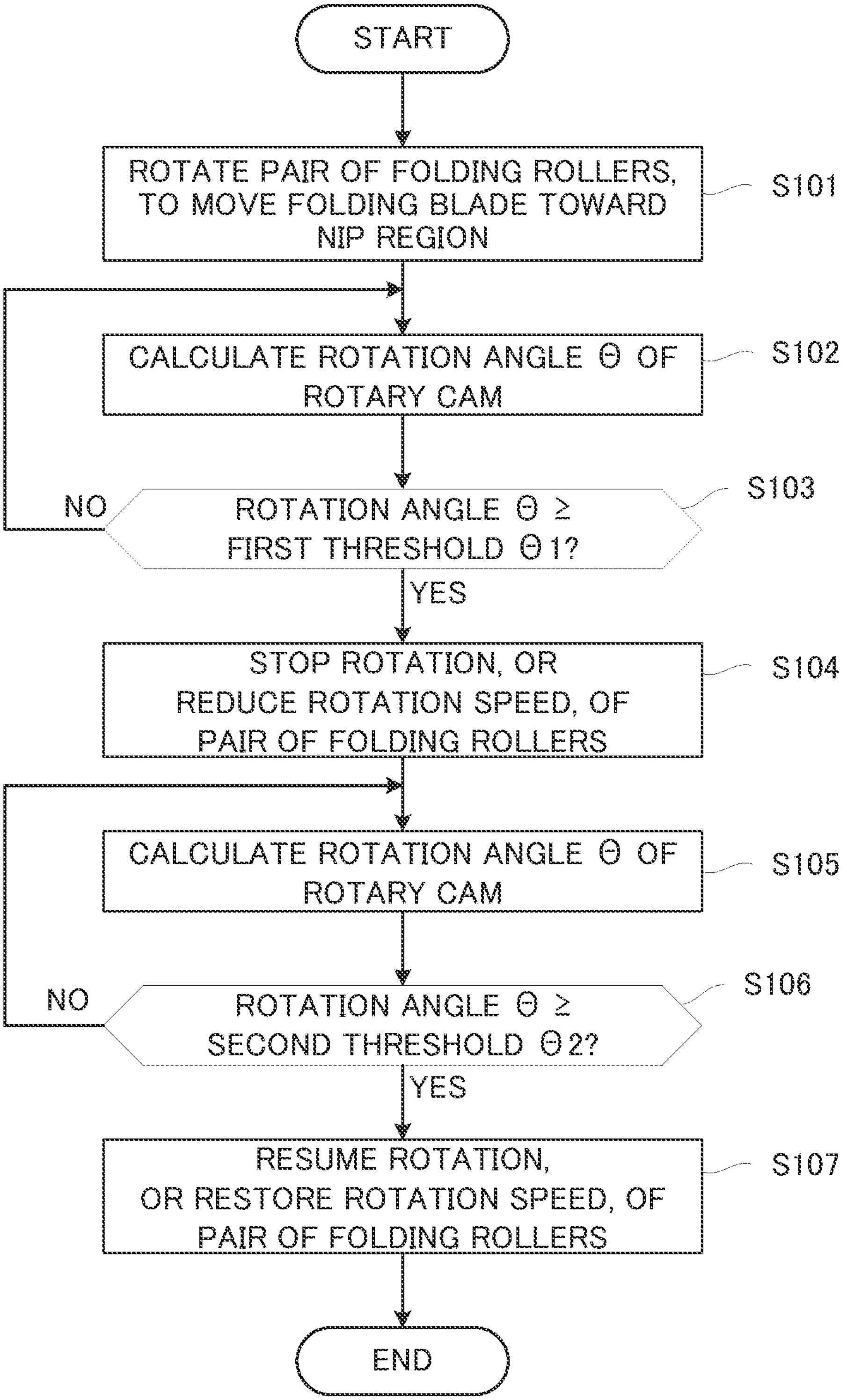
FIG. 7 is a flowchart showing a process for controlling rotation of a pair of folding rollers.

To be more specific, in the case of deciding that the image forming apparatus 10 is configured to perform the ink jet printing, the drive controller 56 causes the motor serving as the drive source of the pair of folding rollers 78, and the stepping motor serving as to drive source of the rotary cam 80 to rotate, thereby performing the second rotation control, according to the process shown in FIG. 7. Therefore, the trouble that the motor is stopped can be avoided, even though the force for withdrawing the tip portion 79C of the folding blade 79 is exerted in the direction to impede the rotation of the pair of folding rollers 78, so that the pair of folding rollers 78 are locked.

In contrast, in the case of deciding that the image forming apparatus 10 is configured to perform the electrophotography, the drive controller 56 performs the first rotation control, including causing the pair of folding rollers 78 to keep rotating at a constant rotation speed, while causing the tip portion 79C of the folding blade 79 to move toward and away from the nip region NP between the pair of folding rollers 78, by causing the motor serving as the drive source of the pair of folding rollers 78, and the stepping motor serving as the drive source of the rotary cam 80, to rotate. Therefore, the sheaf of the recording sheets can be quickly folded and transported by the pair of folding rollers 78, without a chance that the recording sheets P become deviated from each other, despite being dragged in the direction in which the tip portion 79C of the folding blade 79 is withdrawn.

FOURTH EMBODIMENT

In the fourth embodiment, the drive controller 56 selectively performs the second rotation control or the first rotation control, depending on the extent of the friction between the respective surfaces of the recording sheets P (that is, depending on whether the frictional force between the sheets in the sheaf of the recording sheets P is equal to or larger than a predetermined value), instead of depending on whether the image forming apparatus 10 is configured to perform the ink jet printing or electrophotography, as in the third embodiment.

In the case of the recording sheets P on which the image of the document M is formed by ink jet printing, the surface of the recording sheet P is wet with the ink, and therefore the friction between the recording sheets P constituting the sheaf of the recording sheets is high. In contrast, in the case of the recording sheets P on which the image of the document M is formed by electrophotography, the surface of the recording sheet P is dry, and also smoothened by the wax, and therefore the friction between the recording sheets P constituting the sheaf of the recording sheets is low. Further, the friction between the respective surfaces of the recording sheets P varies, depending on the type of the recording sheet P. Furthermore, the friction between the respective surfaces of the recording sheets P varies, depending on the print coverage or size on the recording sheet P, and variation of environment such as temperature and humidity.

The user inputs the instruction to perform the saddle-stitch binding operation, and the extent of the friction between the surfaces of the recording sheets P, by operating the GUI displayed on the screen of the display device 41, through the touch panel 43. Then the user sets a plurality of documents M on the image reading device 11, and inputs the copying instruction, by pressing the start key of the operation device 42.

The controller 46 of the image forming apparatus 10 outputs a control signal including the instruction to perform the saddle-stitch binding operation, and the information indicating the extent of the friction between the surfaces of the recording sheets P, to the postprocessing device 20 via the I/F 47. At the same time, the controller 46 causes the image reading device 11 to sequentially read the images of the documents M, causes the image forming device 12 to form the images of the documents M on the respective recording sheets P, and sequentially transports the recording sheets P to the postprocessing device 20.

The drive controller 56 of the postprocessing device 20 receives the control signal via the I/F 57, and sequentially receives the recording sheets P delivered from the image forming apparatus 10. The drive controller 56 then controls the operation of the saddle-stitch binder 27 so as to perform the stapling operation on the central portion of the sheaf of the recording sheets composed of a plurality of recording sheets P, folds the sheaf of the recording sheets at the center, and delivers the sheaf of the recording sheets to the output tray 28.

When the control signal indicates that the friction between the surfaces of the recording sheets is high, the drive controller 56 causes the motor serving as the drive source of the pair of folding rollers 78, and the stepping motor serving as to drive source of the rotary cam 80 to rotate, thereby performing the second rotation control, according to the process shown in FIG. 7. Therefore, the trouble that the motor is stopped can be avoided, even though the force for withdrawing the tip portion 79C of the folding blade 79 is exerted in the direction to impede the rotation of the pair of folding rollers 78, so that the pair of folding rollers 78 are locked.

In contrast, when the control signal indicates that the friction between the surfaces of the recording sheets is low, the drive controller 56 of the postprocessing device 20 performs the first rotation control, including causing the motor serving as the drive source of the pair of folding rollers 78, and the stepping motor serving as the drive source of the rotary cam 80, to rotate. Therefore, the sheaf of the recording sheets can be quickly folded and transported by the pair of folding rollers 78, without a chance that the recording sheets P become deviated from each other.

As described above, the frictional force between the sheaf of the recording sheets and the pair of folding rollers 78, and the frictional force between the tip portion 79C of the folding blade 79 and the sheaf of the recording sheets are different, between the sheaf of the recording sheets on which the image is formed by ink jet printing, and the sheaf of the recording sheets on which the image is formed by electrophotography. Accordingly, it is necessary to optimize the setting for withdrawing the tip portion 79C of the folding blade 79 from the folded portion of the folded sheaf of the recording sheets, according to the magnitude of the frictional force.

In the aforementioned known folding device, the moving speed of the folding blade is set slower than the linear speed of the pair of folding rollers. However, no reference is made regarding the optimization of the withdrawing method. In addition, in the foregoing known sheet postprocessing device also, although the moving speed of the squeezing plate is set faster than the transport speed of the recording sheets, the mentioned optimization is not referred to, either.

With the first to the fourth embodiments, in contrast, the relation between the moving speed of the tip portion 79C of the folding blade 79 and the moving speed of the pair of folding rollers 78 can be appropriately arranged through the optimization, so that the sheaf of the recording sheets can be folded without trouble.

OTHER EMBODIMENTS

For example, the controller 46 of the image forming apparatus 10 may decide and indicate the extent of the friction between the surfaces of the recording sheets P, instead that the user inputs the extent of the friction between the surfaces of the recording sheets P. In this case, the controller 46 of the image forming apparatus 10 may decide whether the image forming apparatus 10 is configured to perform the ink jet printing or electrophotography, acquire the type and size of the recording sheet P on the basis of the instruction inputted by the user, calculate and acquire the print coverage on the recording sheet P, and acquire the temperature or humidity detected by a sensor, thereby identifying the extent of the friction between the surfaces of the recording sheets P on the basis of the cited information, and output the control signal including the instruction to perform the saddle-stitch binding operation, and the information indicating the extent of the friction between the surfaces of the recording sheets P, to the postprocessing device 20 via the I/F 47. In this case, in the third and fourth embodiments, the drive controller 56 of the postprocessing device 20 selectively performs the second rotation control or the first rotation control, according to such control signal.

Although the drive controller 56 is provided in the postprocessing device 20 in the foregoing embodiments, the drive controller 56 may be excluded, and the controller 46 may directly control the postprocessing device 20.

In addition, a cam of a different type from the rotary cam 80 may be employed. Among the wide variety of known cams, for example, a cam that converts a horizontal motion to a vertical motion may be employed, instead of the rotary cam 80. In addition, a link mechanism that converts a rotating motion into a reciprocating motion may be employed, to move the folding blade 79 toward and away from the nip region NP between the pair of folding rollers 78.

Further, the configurations and processings described in the foregoing embodiment and variations with reference to FIG. 1 to FIG. 9 are merely exemplary, and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. A postprocessing device that receives a sheet from an image forming apparatus that forms an image of a document on the sheet, and performs postprocessing on the sheet, the postprocessing device comprising:

a pair of folding rollers that define a nip region by being pressed against each other, and rotate in opposite directions to each other;

a folding blade configured to move toward and away from the nip region;

a transport device that transports the sheet to a position between the nip region and the folding blade;

a roller driver that causes the pair of folding rollers to rotate;

a blade driver that moves the folding blade toward and away from the nip region; and a drive controller configured to control operation of the roller driver and the blade driver, the drive controller being configured to:

control the blade driver to cause the folding blade to move toward the nip region, thereby squeezing a sheaf of sheets including a plurality of sheets into the nip region and folding the sheaf of sheets, and then to cause the folding blade to move away from the nip region;

selectively perform one of a first rotation control, including controlling the roller driver to keep rotation speed of the pair of folding rollers constant, while the folding blade is moving away from the nip region; and a second rotation control, including controlling the roller driver to stop the rotation or slow down the rotation speed of the pair of folding rollers, while a tip portion of the folding blade is being withdrawn from a folded portion of the sheaf of sheets folded, and to restore the rotation speed of the pair of folding rollers to original rotation speed, after the tip portion of the folding blade has been removed from the folded portion of the sheaf of sheets folded, wherein the drive controller is configured to:

select the second rotation control when a frictional force between the sheets in the sheaf of sheets is equal to or larger than a predetermined value, and select the first rotation control when the frictional force between the sheets in the sheaf of sheets is smaller than the predetermined value.

2. The postprocessing device according to claim 1, wherein the image forming apparatus includes an operation device through which an instruction of a user is inputted, the instruction includes a magnitude of the frictional force, and the drive controller selects one of the first rotation control and the second rotation control, on a basis of the magnitude of the frictional force, indicated by the instruction inputted on the operation device.

3. A postprocessing device that receives a sheet from an image forming apparatus that forms an image of a document on the sheet, and performs postprocessing on the sheet, the postprocessing device comprising:

a pair of folding rollers that define a nip region by being pressed against each other, and rotate in opposite directions to each other;

a folding blade configured to move toward and away from the nip region;

a transport device that transports the sheet to a position between the nip region and the folding blade;

a roller driver that causes the pair of folding rollers to rotate;

a blade driver that moves the folding blade toward and away from the nip region; and a drive controller configured to control operation of the roller driver and the blade driver, the drive controller being configured to:

control the blade driver to cause the folding blade to move toward the nip region, thereby squeezing a sheaf of sheets including a plurality of sheets into the nip region and folding the sheaf of sheets, and then to cause the folding blade to move away from the nip region;

selectively perform one of a first rotation control, including controlling the roller driver to keep rotation speed of the pair of folding rollers constant, while the folding blade is moving away from the nip region; and a second rotation control, including controlling the roller driver to stop the rotation or slow down the rotation speed of the pair of folding rollers, while a tip portion of the folding blade is being withdrawn from a folded portion of the sheaf of sheets folded, and to restore the rotation speed of the pair of folding rollers to original rotation speed, after the tip portion of the folding blade has been removed from the folded portion of the sheaf of sheets folded, wherein the drive controller is configured to select the second rotation control when a printing method of the image forming apparatus is ink jet printing, and select the first rotation control when the printing method of the image forming apparatus is electrophotography.

4. The postprocessing device according to claim 3, wherein the image forming apparatus includes an operation device through which an instruction of a user is inputted, the instruction includes a type of the printing method, and the drive controller selects one of the first rotation control and the second rotation control, on a basis of the type of the printing method, indicated by the instruction inputted on the operation device.

5. A postprocessing device comprising:

a pair of folding rollers that define a nip region by being pressed against each other, and rotate in opposite directions to each other;

a folding blade configured to move toward and away from the nip region;

a transport device that transports the sheet to a position between the nip region and the folding blade;

a roller driver that causes the pair of folding rollers to rotate;

a blade driver that moves the folding blade toward and away from the nip region; and a drive controller configured to control operation of the roller driver and the blade driver, the drive controller being configured to:

control the blade driver to cause the folding blade to move toward the nip region, thereby squeezing a sheaf of sheets including a plurality of sheets into the nip region and folding the sheaf of sheets, and then to cause the folding blade to move away from the nip region; and keep rotation speed of the pair of folding rollers constant, while the folding blade is moving away from the nip region.

* * * * *